(12) United States Patent
Li

(10) Patent No.: US 12,046,932 B2
(45) Date of Patent: Jul. 23, 2024

(54) CHARGING CIRCUIT AND ELECTRONIC DEVICE

(71) Applicant: VIVO MOBILE COMMUNICATION CO., LTD., Chang'an Dongguan (CN)

(72) Inventor: Zhendong Li, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 440 days.

(21) Appl. No.: 17/390,361

(22) Filed: Jul. 30, 2021

(65) Prior Publication Data

US 2021/0359532 A1    Nov. 18, 2021

Related U.S. Application Data

(63) Continuation of application No. PCT/CN2020/071935, filed on Jan. 14, 2020.

(30) Foreign Application Priority Data

Jan. 31, 2019    (CN) .......................... 201910098936.5

(51) Int. Cl.
*H02J 7/00*    (2006.01)
(52) U.S. Cl.
CPC ...... *H02J 7/00309* (2020.01); *H02J 7/00308* (2020.01)
(58) Field of Classification Search
CPC .......................... H02J 7/00309; H02J 7/00308

(Continued)

(56) References Cited

U.S. PATENT DOCUMENTS

| 2003/0174453 | A1 | 9/2003 | Hsu et al. |
| 2014/0268431 | A1* | 9/2014 | Rozman ................ H02H 7/103 |
| | | | 363/53 |

(Continued)

FOREIGN PATENT DOCUMENTS

| CN | 102064541 A | 5/2011 |
| CN | 103151911 A | 6/2013 |

(Continued)

OTHER PUBLICATIONS

Extended European Search Report for related Application No. 20749257.0; reported on Feb. 28, 2022.

(Continued)

*Primary Examiner* — Nathaniel R Pelton
(74) *Attorney, Agent, or Firm* — von Briesen & Roper, s.c.

(57) ABSTRACT

A charging circuit and an electronic device are provided, where the charging circuit includes: a charging receptacle, where a connection path is provided between a charging terminal of the charging receptacle and a to-be-charged battery; a temperature control and surge protection circuit, where the temperature control and surge protection circuit includes: a switch tube, where the switch tube includes a first terminal, a second terminal, and a control terminal that controls the first terminal and the second terminal to be turned on or off, the first terminal is connected to the connection path, and the second terminal is grounded; a temperature control circuit, configured to acquire temperature data of the charging receptacle and control a working status of the switch tube; a voltage control circuit, with one end connected to the control terminal of the switch tube, and the other end connected to the connection path.

16 Claims, 2 Drawing Sheets

(58) Field of Classification Search
USPC .......................................................... 320/134
See application file for complete search history.

(56) References Cited

U.S. PATENT DOCUMENTS

2017/0085102 A1* 3/2017 Wu ........................ H02J 7/0036
2017/0271897 A1* 9/2017 Wen .......................... H02H 5/04

FOREIGN PATENT DOCUMENTS

| CN | 204333904 U | | 5/2015 |
|---|---|---|---|
| CN | 106356823 | * | 1/2017 |
| CN | 106356823 A | | 1/2017 |
| CN | 206272219 U | | 6/2017 |
| CN | 207530551 U | | 6/2018 |
| CN | 109038529 A | | 12/2018 |
| CN | 109193878 A | | 1/2019 |
| CN | 208401571 U | | 1/2019 |
| CN | 109728631 A | | 5/2019 |
| EP | 2079142 A1 | | 7/2009 |
| EP | 2779379 A2 | | 9/2014 |
| EP | 3211740 A1 | | 8/2017 |
| JP | 2018010846 A | | 1/2018 |
| KR | 20170084306 A | | 7/2017 |

OTHER PUBLICATIONS

Chinese First Office Action related to Application No. 201910098936.5; reported on May 26, 2020.
Chinese Second Office Action related to Application No. 201910098936.5; reported on Sep. 10, 2020.
Chinese Search Report related to Application No. 201910098936.5; reported on Jun. 1, 2020.
International Search Report & Written Opinion related to Application No. PCT/CN2020/071935; reported on Apr. 20, 2020.
South Korean Request for the Submission of an Opinion for related Application No. 10-2021-7027824; reported on Jun. 16, 2023.

* cited by examiner

CHARGING CIRCUIT AND ELECTRONIC DEVICE

CROSS-REFERENCE TO RELATED APPLICATIONS

This application is continuation application of PCT International Application No. PCT/CN2020/071935 filed on Jan. 14, 2020, which claims priority to Chinese Patent Application No. 201910098936.5, filed in China on Jan. 31, 2019, the disclosures of which are incorporated herein by reference in their entireties.

TECHNICAL FIELD

This disclosure relates to the electronic field, in particular, to a charging circuit and an electronic device.

BACKGROUND

With development of fast charging technologies in the field of electronic devices, charging power is increasing, and reliability of charging is becoming increasingly important.

For a charging circuit in the related art, a large number of protective components are used to improve reliability of the charging process. Moreover, due to a relatively high DC/surge power at VBUS, protective components are all large packaged components, occupying a large area on a printed circuit board (PCB), which is not conducive to wiring layout and PCB cost reduction.

SUMMARY

Embodiments of the disclosure provide a charging circuit and an electronic device.

This disclosure is implemented as follows:

According to a first aspect, an embodiment of this disclosure provides a charging circuit, including:

a charging receptacle, where a connection path is provided between a charging terminal of the charging receptacle and a to-be-charged battery; and a temperature control and surge protection circuit, where the temperature control and surge protection circuit includes:

a switch tube, where the switch tube includes a first terminal, a second terminal, and a control terminal that controls the first terminal and the second terminal to be turned on or off, where the first terminal is connected to the connection path, and the second terminal is grounded;

a temperature control circuit, configured to acquire temperature data of the charging receptacle and control a working status of the switch tube; and a voltage control circuit, with one end connected to the control terminal of the switch tube, and the other end connected to the connection path, where the voltage control circuit is configured to control the switch tube to be turned on when a voltage of the charging terminal exceeds a predetermined threshold.

According to a second aspect, an embodiment of this disclosure further provides an electronic device, including the charging circuit described above.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

Figure 1:
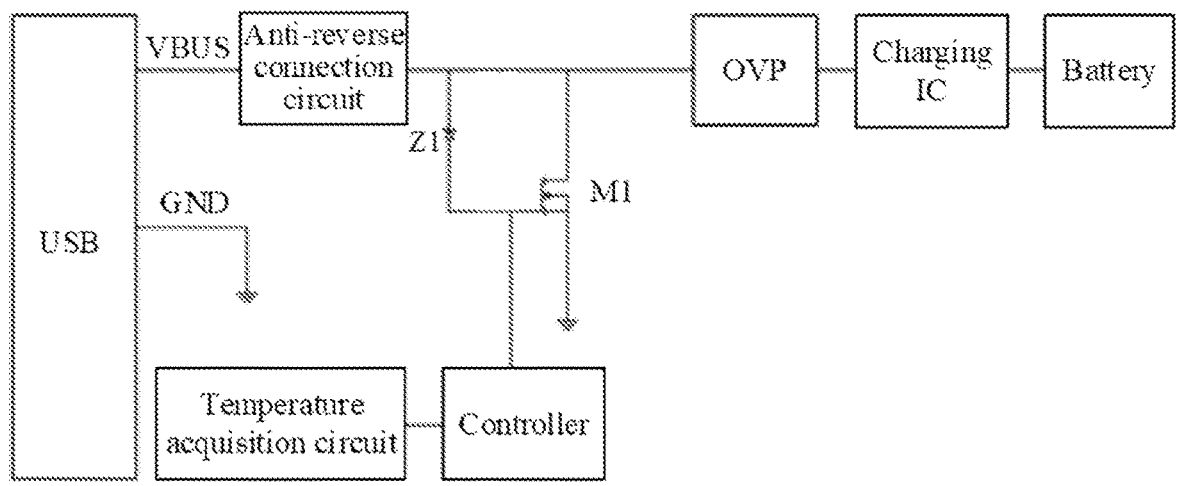
FIG. 1 is a first schematic structural diagram of a charging circuit according to an embodiment of this disclosure.
Figure 2:
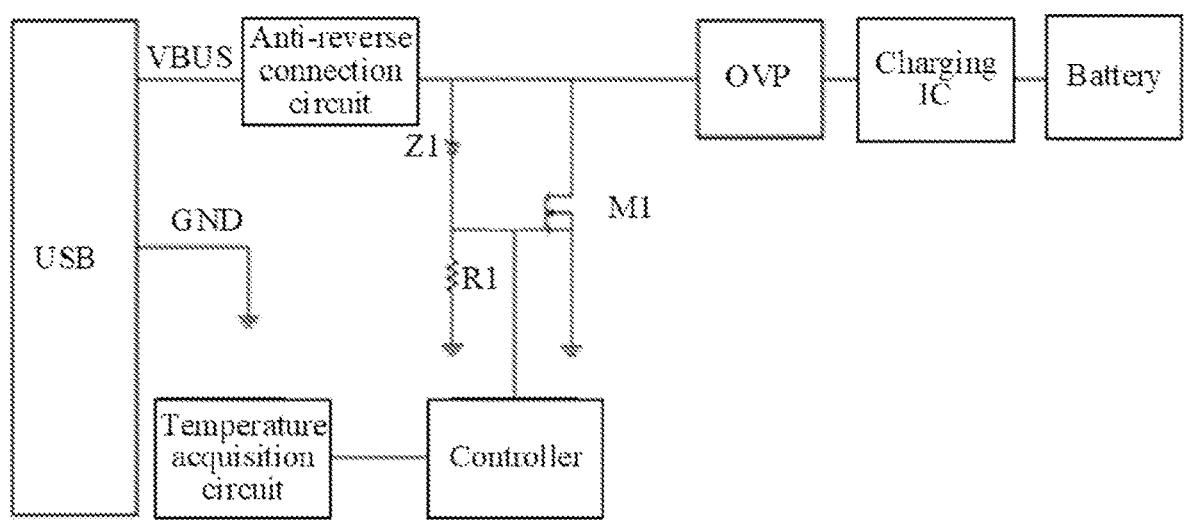
FIG. 2 is a second schematic structural diagram of a charging circuit according to an embodiment of this disclosure.
Figure 3:
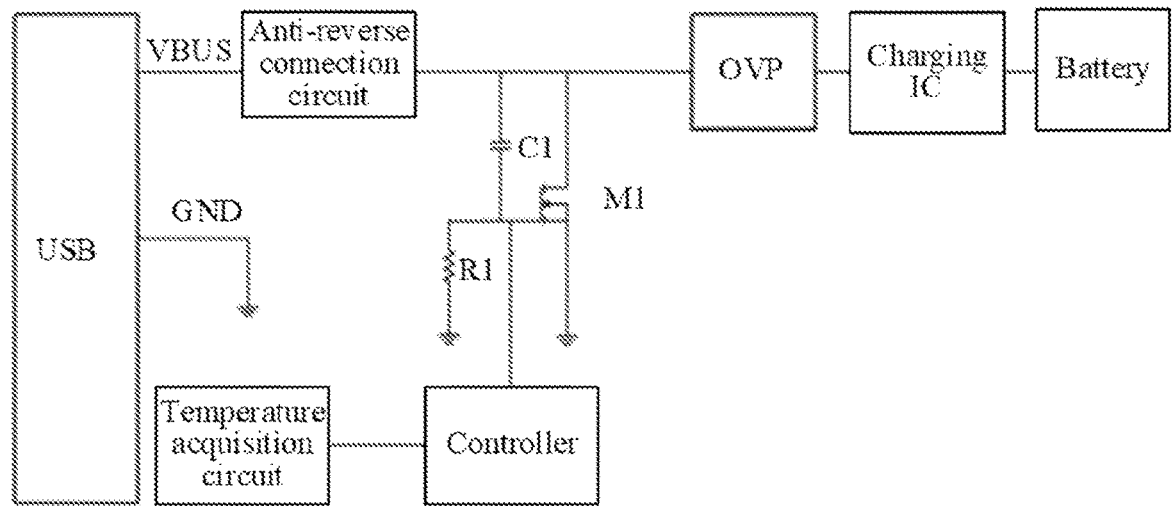
FIG. 3 is a third schematic structural diagram of a charging circuit according to an embodiment of this disclosure.

A charging circuit is disclosed in embodiments of this disclosure with reference to FIG. 1, FIG. 2 and FIG. 3, including:

a charging receptacle, where a connection path is provided between a charging terminal of the charging receptacle and a to-be-charged battery; and a temperature control and surge protection circuit, where the temperature control and surge protection circuit includes:

a switch tube, where the switch tube includes a first terminal, a second terminal, and a control terminal that controls the first terminal and the second terminal to be turned on or off, where the first terminal is connected to the connection path, and the second terminal is grounded;

a temperature control circuit, configured to acquire temperature data of the charging receptacle and control a working status of the switch tube; and a voltage control circuit, with one end connected to the control terminal of the switch tube, and the other end connected to the connection path, where the voltage control circuit is configured to control the switch tube to be turned on when a voltage of the charging terminal exceeds a predetermined threshold.

The charging receptacle is preferably a USB interface, and a charge loop is formed between the charging receptacle and the to-be-charged battery, where the charging receptacle includes a charging terminal (VBUS) and a grounding terminal. Specifically, a temperature control and surge protection circuit is connected in the connection path between the charging terminal of the charging receptacle and a charging battery, so as to implement protection for the charging circuit and the components therein.

The temperature control and surge protection circuit includes: a temperature control circuit and a voltage control circuit. The temperature control circuit is configured for over-temperature protection of the charging receptacle. When a short circuit or micro short circuit occurs in the USB interface due to corrosion, foreign matter and the like and causes heating, the temperature control circuit acquires temperature data of the charging receptacle and controls a working status of the switch tube. The temperature control circuit is connected to the control terminal of the switch tube. When the acquired temperature data is greater than a predetermined temperature threshold, the switch tube is controlled to be on. In this case, the connection path between the charging terminal of the charging receptacle and the to-be-charged battery is grounded through a turned-on switch tube, and the path is disconnected to protect the battery.

The temperature control circuit and the voltage control circuit share a switch tube, on/off of the switch tube is controlled by both the voltage control circuit and the temperature control circuit. Therefore, switch tube multiplexing is implemented by using one switch tube to implement over-temperature protection and anti-surge protection for the circuits simultaneously, thereby achieving dual protection, reducing the number of components, reducing costs, and saving PCB layout area and space.

The switch tube can be a transistor or a MOS tube (metal-oxide-semiconductor field effect transistor). It is preferably a MOS tube. Specifically, in conventional circuits, limited by characteristics of the TVS (a higher TVS breakdown voltage also results in a higher clamping voltage), it is impossible to reduce a surge clamping voltage while a VBUS has a higher DC withstand voltage and therefore, it is impossible to achieve better surge protection effect. Due to a low on resistance, the MOS tube can achieve a lower surge clamping voltage than a conventional TVS, which can better protect back-end components, implement MOS tube multiplexing, and achieve a better surge protection effect without lowering a DC withstand voltage of the VBUS while implementing overvoltage protection.

The foregoing control terminal is a gate of the MOS tube.

Further, with reference to FIG. 1, FIG. 2 and FIG. 3, in a preferred embodiment, the temperature control circuit includes:

a temperature acquisition circuit, configured to acquire temperature data of the charging receptacle; and a controller, with one end connected to the temperature acquisition circuit, and the other end connected to the control terminal of the switch tube, where the controller is configured to receive the temperature data and control the working status of the switch tube.

The temperature acquisition circuit is provided near the charging receptacle to acquire a temperature parameter. The temperature acquisition circuit is preferably a thermistor.

When the controller in the temperature control circuit detects an excessively high temperature of the USB interface with the help of the temperature acquisition circuit, the controller turns the MOS tube on by controlling the gate of the MOS tube to connect the VBUS directly to GND for over-current protection of a charger, preventing the USB interface from burning without being noticed by a user.

Further, in an optional embodiment, with reference to FIG. 1, the voltage control circuit includes:

a first diode Z1, where a cathode of the first diode Z1 is connected to the connection path, and an anode is connected to the control terminal.

The first diode Z1 is reversely connected to respond to an output voltage of the controller. The first diode Z1 can be a Zener diode or a low-power TVS diode (Transient Voltage Suppressor). Its function is to provide a channel for driving a switch tube M1. After a surge is generated in the VBUS, due to Zener breakdown/avalanche breakdown effect, Z1 is quickly broken down, a voltage at a control terminal of the switch tube M1 increases over a driving voltage, and the switch tube M1 is quickly controlled to be turned on with a faster response speed.

Specifically, in the application, under abnormal conditions, if the VBUS generates a surge voltage due to grid fluctuations, lightning strikes, or the like, the surge voltage is transmitted to the gate of the MOS tube through Z1 breakdown, causing the MOS tube to be turned on. After the MOS tube is turned on, because the on resistance Rdson of the MOS tube is very small, a low-resistance path is formed between the VBUS and the GND to quickly discharge a surge current and clamp the VBUS at a relatively low voltage to protect back-end components (OVP, charging IC, battery, and others) from being damaged by the surge.

Optionally, with reference to FIG. 2, the voltage control circuit further includes:

a first resistor R1 connected in series with the first diode Z1, where one end of the first resistor R1 is connected to the anode of the first diode Z1, and the other end is grounded.

The first resistor R1 can prevent the switch tube M1 from being damaged by an excessively high transient voltage when the first diode Z1 is broken down by a surge, thereby protecting the components.

In another optional embodiment, with reference to FIG. 3, the voltage control circuit includes:

a first capacitor C1 and a second resistor R1 that are connected in series, where the first capacitor C1 is connected to the connection path, the second resistor R1 is grounded, a first connecting point is provided between the first capacitor C1 and the second resistor R1, and the first connecting point is connected to the control terminal.

The first capacitor C1 and the second resistor R1 in the voltage control circuit form an RC differential circuit. When the VBUS is powered on, because a voltage across C1 cannot change suddenly, $V_{R1}$=VBUS, and then the voltage across C1 decreases exponentially, the MOS tube is turned on first, forming a low-resistance path between the VBUS and the GND. Then, the gate voltage of the MOS tube decreases exponentially. When the gate voltage drops to an on-voltage threshold Vth of the MOS tube, the MOS tube is turned off, and the connection path between the VBUS and the GND returns to a high-resistance state. By controlling values of R1 and C1, an on-time of the MOS tube and a response time of the circuit can be controlled to suit for different application scenarios.

The specific application situation is as follows: under normal conditions, the VBUS is powered on to form a rising edge, and then the VBUS remains stable. In this state, based on the foregoing analysis, the MOS tube is also turned on for a period of time. By controlling the values of R1 and C1, the period of the on-time is limited to a small range, and the MOS tube returns to an off state in a short time, thereby not affecting a normal charging.

Figure 4:
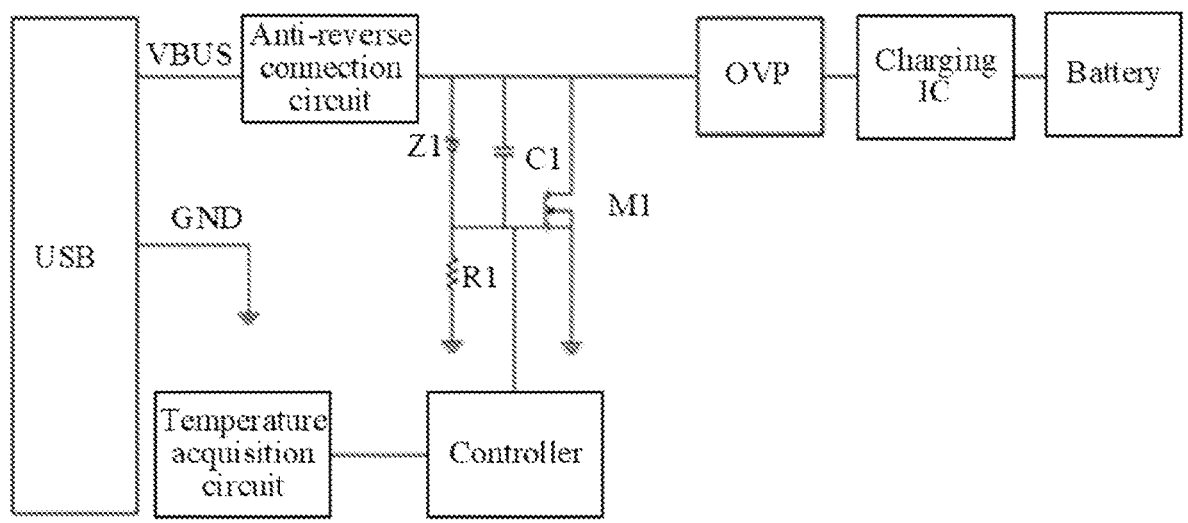
FIG. 4 is a fourth schematic structural diagram of a charging circuit according to an embodiment of this disclosure.

In another optional embodiment, with reference to FIG. 4, the voltage control circuit includes:

a second capacitor C1 and a third resistor R1 that are connected in series, where the second capacitor C1 is connected to the connection path, the third resistor R1 is grounded, a second connecting point is provided between the second capacitor C1 and the third resistor R1, and the second connecting point is connected to the control terminal; and a second diode Z1, where a cathode of the second diode Z1 is connected to the connection path, and an anode of the second diode Z1 is connected to the second connecting point.

An embodiment of the voltage control circuit combines the circuit structures of the foregoing two embodiments, and may have the effects and advantages of the foregoing two embodiments. When the VBUS generates a surge under a special circumstance and the voltage rises rapidly, the Z1 is quickly broken down and turns on the MOS tube due to the Zener breakdown/avalanche breakdown effect, which can provide a faster response speed than a case with the combination of the C1 and the R1, ensuring circuit protection under extreme conditions. In the charging circuit, a conduction circuit including an avalanche diode and a capacitor resistance can control on/off of the MOS tube, so that the surge can be quickly discharged. By controlling the values of R1 and C1, an on-time of the MOS tube and a response time of the circuit can be controlled. The two methods can be applied together to deal with different voltage control scenarios, and both may use one same switch tube, reducing the number of components, saving layout space, and reducing costs.

In this embodiment, a diode is connected in parallel with a capacitor. When a grounded resistor forms an RC differential circuit with the capacitor, the resistor may prevent the diode from being broken down by a surge, and the switch tube from being damaged by an excessively high transient voltage, thereby protecting the components.

Further, in the connection path between the charging terminal of the charging receptacle and the to-be-charged battery along a direction from the charging socket to the to-be-charged battery, an anti-reverse connection circuit, an overvoltage protection (OVP) circuit, and a charging control chip (charging IC) are sequentially connected.

The voltage control circuit is connected to a position between the anti-reverse connection circuit and the overvoltage protection circuit of the connection path, to protect back-end components through the temperature control and surge protection circuit.

The anti-reverse connection circuit can be implemented by connecting a rectifier bridge or reversely connecting a diode. This is not specifically limited herein.

Further, this disclosure further discloses an electronic device, including the charging circuit described in any of foregoing embodiments, which helps to reduce the number of components, reduce costs and save PCB layout area and space, making it possible to provide thinner electronic devices.

The electronic device may include but is not limited to a mobile phone, a tablet computer, a smart band, a smart watch, a smart voice box and other rechargeable devices.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . ." does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disc), and includes several instructions for instructing a terminal (which may be a mobile phone, a computer, a server, an air conditioner, a network device, or the like) to perform the methods described in the embodiments of this disclosure.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A charging circuit, comprising:
 a charging receptacle, wherein a connection path is provided between a charging terminal of the charging receptacle and a to-be-charged battery; and
 a temperature control and surge protection circuit, wherein the temperature control and surge protection circuit comprises:
 a switch tube, wherein the switch tube comprises a first terminal, a second terminal, and a control terminal that controls the first terminal and the second terminal to be turned on or off, wherein the first terminal is connected to the connection path, and the second terminal is grounded;
 a temperature control circuit, configured to acquire temperature data of the charging receptacle and control a working status of the switch tube; and
 a voltage control circuit, with one end connected to the control terminal of the switch tube, and the other end connected to the connection path, wherein the voltage control circuit is configured to control the switch tube to be turned on when a voltage of the charging terminal exceeds a predetermined threshold;
 wherein one end of the temperature control circuit is connected to the control terminal of the switch tube;
 the voltage control circuit comprises:
 a second capacitor and a third resistor that are connected in series, wherein
 the second capacitor is connected to the connection path, the third resistor is grounded, a second connecting point is provided between the second capacitor and the third resistor, and the second connecting point is connected to the control terminal; and
 a second diode, wherein a cathode of the second diode is connected to the connection path, and an anode of the second diode is connected to the second connecting point.

2. The charging circuit according to claim 1, wherein the temperature control circuit comprises:
 a temperature acquisition circuit, configured to acquire temperature data of the charging receptacle; and
 a controller, with one end connected to the temperature acquisition circuit, and the other end connected to the control terminal of the switch tube, wherein the controller is configured to receive the temperature data and control the working status of the switch tube.

3. The charging circuit according to claim 1, wherein the voltage control circuit comprises:
 a first diode, wherein a cathode of the first diode is connected to the connection path, and an anode of the first diode is connected to the control terminal.

4. The charging circuit according to claim 3, wherein the voltage control circuit further comprises:
 a first resistor connected in series with the first diode, wherein one end of the first resistor is connected to the anode of the first diode, and the other end is grounded.

5. The charging circuit according to claim 1, wherein the voltage control circuit comprises:

a first capacitor and a second resistor that are connected in series, wherein the first capacitor is connected to the connection path, the second resistor is grounded, a first connecting point is provided between the first capacitor and the second resistor, and the first connecting point is connected to the control terminal.

6. The charging circuit according to claim 1, wherein in the connection path along a direction from the charging receptacle to the to-be-charged battery, an anti-reverse connection circuit, an overvoltage protection circuit, and a charging control chip are sequentially connected.

7. The charging circuit according to claim 6, wherein the voltage control circuit is connected to a position between the anti-reverse connection circuit and the overvoltage protection circuit of the connection path.

8. The charging circuit according to claim 1, wherein the switch tube is a MOS tube.

9. An electronic device, comprising a charging circuit; wherein the charging circuit comprises:

a charging receptacle, wherein a connection path is provided between a charging terminal of the charging receptacle and a to-be-charged battery; and a temperature control and surge protection circuit, wherein the temperature control and surge protection circuit comprises:

a switch tube, wherein the switch tube comprises a first terminal, a second terminal, and a control terminal that controls the first terminal and the second terminal to be turned on or off, wherein the first terminal is connected to the connection path, and the second terminal is grounded;

a temperature control circuit, configured to acquire temperature data of the charging receptacle and control a working status of the switch tube; and a voltage control circuit, with one end connected to the control terminal of the switch tube, and the other end connected to the connection path, wherein the voltage control circuit is configured to control the switch tube to be turned on when a voltage of the charging terminal exceeds a predetermined threshold;

wherein one end of the temperature control circuit is connected to the control terminal of the switch tube;

the voltage control circuit comprises:

a second capacitor and a third resistor that are connected in series, wherein the second capacitor is connected to the connection path, the third resistor is grounded, a second connecting point is provided between the second capacitor and the third resistor, and the second connecting point is connected to the control terminal; and a second diode, wherein a cathode of the second diode is connected to the connection path, and an anode of the second diode is connected to the second connecting point.

10. The electronic device according to claim 9, wherein the temperature control circuit comprises:

a temperature acquisition circuit, configured to acquire temperature data of the charging receptacle; and a controller, with one end connected to the temperature acquisition circuit, and the other end connected to the control terminal of the switch tube, wherein the controller is configured to receive the temperature data and control the working status of the switch tube.

11. The electronic device according to claim 9, wherein the voltage control circuit comprises:

a first diode, wherein a cathode of the first diode is connected to the connection path, and an anode of the first diode is connected to the control terminal.

12. The electronic device according to claim 11, wherein the voltage control circuit further comprises:

a first resistor connected in series with the first diode, wherein one end of the first resistor is connected to the anode of the first diode, and the other end is grounded.

13. The electronic device according to claim 9, wherein the voltage control circuit comprises:

a first capacitor and a second resistor that are connected in series, wherein the first capacitor is connected to the connection path, the second resistor is grounded, a first connecting point is provided between the first capacitor and the second resistor, and the first connecting point is connected to the control terminal.

14. The electronic device according to claim 9, wherein in the connection path along a direction from the charging receptacle to the to-be-charged battery, an anti-reverse connection circuit, an overvoltage protection circuit, and a charging control chip are sequentially connected.

15. The electronic device according to claim 14, wherein the voltage control circuit is connected to a position between the anti-reverse connection circuit and the overvoltage protection circuit of the connection path.

16. The electronic device according to claim 9, wherein the switch tube is a MOS tube.

\* \* \* \* \*